E. C. DES ENFANTS AND F. A. HUMMEL.
ROTARY INTERNAL COMBUSTION ENGINE.
APPLICATION FILED OCT. 13, 1919.

1,364,256.

Patented Jan. 4, 1921.
6 SHEETS—SHEET 1.

Fig 1

INVENTORS:
Ernest C. Des Enfants and
Floyd A. Hummel
By J. H. Jochum Jr. ATTORNEY.

E. C. DES ENFANTS AND F. A. HUMMEL.
ROTARY INTERNAL COMBUSTION ENGINE.
APPLICATION FILED OCT. 13, 1919.

1,364,256.

Patented Jan. 4, 1921.
6 SHEETS—SHEET 2.

INVENTORS
Ernest C. Des Enfants
Floyd A. Hummel
By Jos. Jochum Jr. ATTORNEY

E. C. DES ENFANTS AND F. A. HUMMEL.
ROTARY INTERNAL COMBUSTION ENGINE.
APPLICATION FILED OCT. 13, 1919.

1,364,256.

Patented Jan. 4, 1921.
6 SHEETS—SHEET 5.

INVENTORS:
Ernest C. Des Enfants and
Floyd A. Hummel
By J. F. Jochum, ATTORNEY.

E. C. DES ENFANTS AND F. A. HUMMEL.
ROTARY INTERNAL COMBUSTION ENGINE.
APPLICATION FILED OCT. 13, 1919.

1,364,256.

Patented Jan. 4, 1921.
6 SHEETS—SHEET 6.

UNITED STATES PATENT OFFICE.

ERNEST C. DES ENFANTS AND FLOYD A. HUMMEL, OF CHICAGO, ILLINOIS.

ROTARY INTERNAL-COMBUSTION ENGINE.

1,364,256.  Specification of Letters Patent.  Patented Jan. 4, 1921.

Application filed October 13, 1919. Serial No. 330,420.

*To all whom it may concern:*

Be it known that we, ERNEST C. DES ENFANTS and FLOYD A. HUMMEL, citizens of the United States, residing at Chicago, in the county of Cook and State of Illinois, have invented certain new and useful Improvements in Rotary Internal-Combustion Engines, of which the following is a specification.

This invention relates to improvements in rotary internal combustion engines of the turbine type, particularly adapted, though not necessarily limited to the use of gasolene as the motive fluid, and one of the objects of the invention is to provide an improved engine of this character having means for insuring a clean charge of fuel for each explosion.

A further object is to provide an improved engine of this character in which the charge will be exploded between two movable heads and at the diametric center of the cylinder in order to obtain the full benefit of a complete explosion of the charge, the movable heads being so constructed as to operate close together while at the same time the spark plug or ignition device will not be damaged, and itself will not interfere with the operation of the movable heads.

A further object is to provide an improved engine of this character in which the full expansive force of the exploded charge will operate on a rotor and at the same time when the charge is discharged or leaves the rotor, the full expansive force of the charge will have been utilized and it will leave the rotor noiselessly, thereby dispensing with the necessity for the use of a muffler.

A further object is to provide an improved engine of this character in which the rotatable parts operate to direct or circulate a current of air against the cylinders and other parts to cool them.

A further object is to provide an improved engine of this character embodying opposed reciprocable pistons between which the charge is exploded and means whereby the force of the explosion will not be utilized to separate the pistons, but instead, an exhaust valve will be opened to discharge the force of the explosion against the vanes of the rotor just after the explosion and before the pistons reach the limits of their inward movements so that a full inward movement of the pistons just after the explosion will force the exploding charge (or gas in a live condition) against the blades of the rotor so that the full force of the expanding gases will act upon the blades of the rotor.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which;

Referring more particularly to the drawings, the numeral 10 designates a series of cylinders arranged concentrically about a shaft 11, the longitudinal diameter of the respective cylinders being parallel with the axis of rotation of the shaft 11.

These cylinders 10 may be of any desired size and are spaced for a considerable distance from the shaft 11. The cylinders are held against rotation in any suitable manner but preferably by being formed integrally with a supporting structure 12 and which structure is formed with a longitudinal bearing 13 through which the shaft 11 passes.

Figure 5:
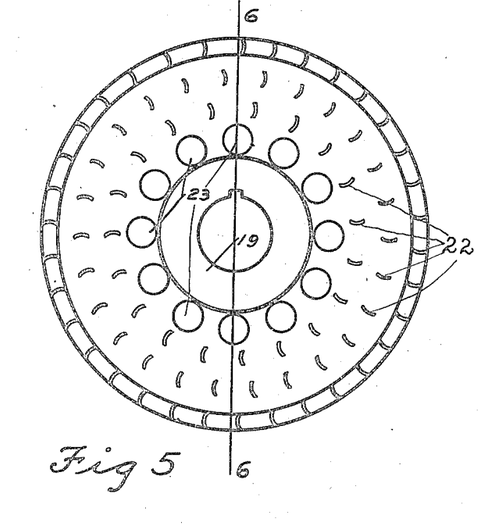
Fig. 5 is an elevation of one face of the rotor.
Figure 6:
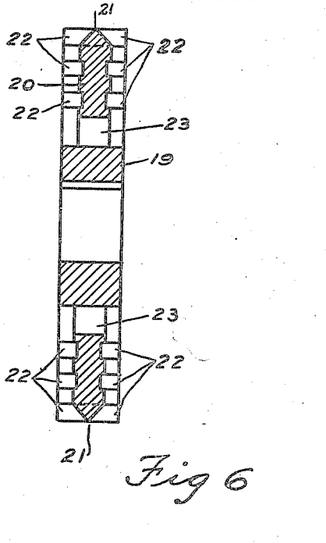
Fig. 6 is a vertical sectional view taken on line 6—6, Fig. 5.
Figure 7:
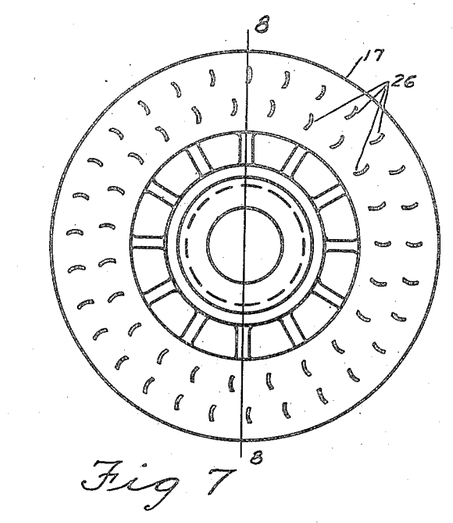
Fig. 7 is a front elevation of one face of the rotor casing.
Figure 8:
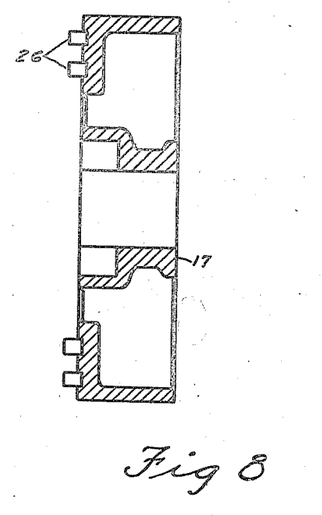
Fig. 8 is a vertical sectional view taken on line 8—8, Fig. 7.
Figure 9:
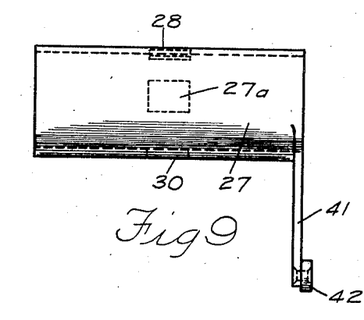
Fig. 9 is a side elevation of one of the sleeve valves.
Figure 10:
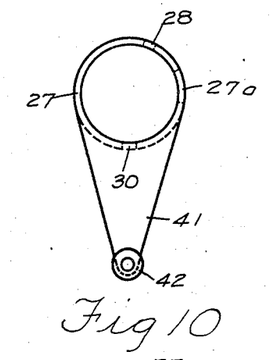
Fig. 10 is a right hand elevation of Fig. 9.
Figure 11:
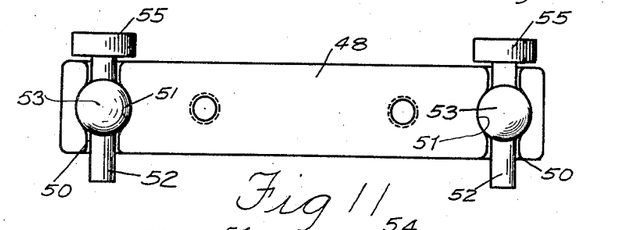
Fig. 11 is a top plan view of one of the elements of the connecting link between the piston and its operating element and showing the pivot bolts in position.
Figures 12, 13:
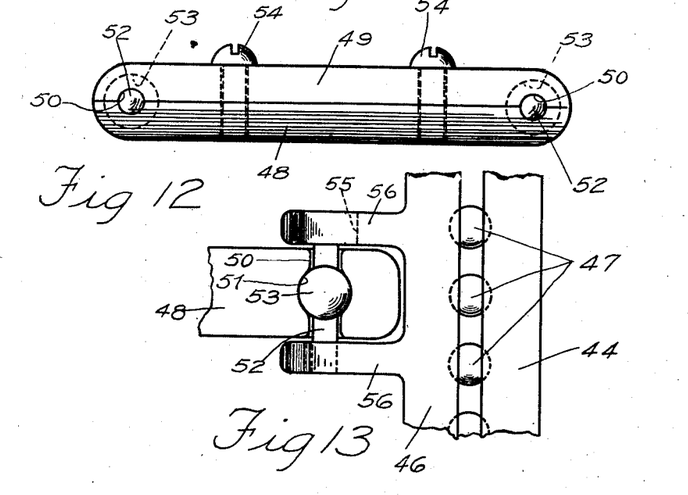
Fig. 12 is a side elevation of the connecting link.
Fig. 13 is a detail view as taken on line 13—13, Fig. 1.
Figure 14:
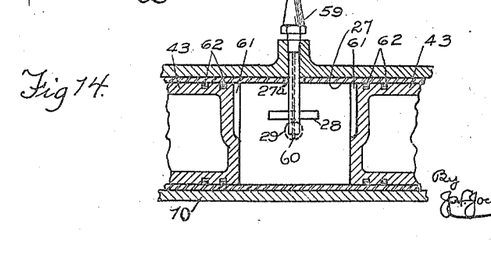
Fig. 14 is a detailed sectional view showing the adjacent ends of the pistons and the pockets for receiving the spark plug.

Roller bearings 14—15 may be provided in the bearing 13 for the shaft. Coöperating with the structure 12 is a frame element 16 which is itself provided with a bearing 17 through which the shaft 11 passes and roller bearings 18 may be provided in the bearing 17 and spaced from the roller bearings 14. A rotor 19 is connected with the shaft 11 to rotate therewith and this rotor is provided with a central portion or core 20 of any desired diameter, but is preferably of a diameter to rotate within the series of cylinders 10. The periphery of the rotor 20 is preferably beveled as at 21 and projecting laterally beyond opposite faces of the rotor are a series of blades 22, any desired number of which may be provided. These blades are preferably curved as shown more clearly in Fig. 5 and the core 20 is provided adjacent its center with a series of openings 23 for a purpose to be hereinafter set forth. The rotor 19 is arranged between adjacent ends of the bearings 13—17 and extends into a chamber 24 formed adjacent each of the cylinders 10 and which chamber 24 has communication with the respective cylinders 10 by means of suitable openings 25 to permit the exploded charge to pass from the cylinders into the chamber 24 and against the blades 22 of the rotor. The walls of the chamber 24 are provided with a series of laterally projecting and concentrically spaced blades 26 arranged on opposite sides of the rotor which coöperate with the respective blades 22 of the rotor to assist the rotor in being propelled by the exploded charge.

The series of blades 22 on the opposite faces of the rotor are also concentrically spaced and the respective series of blades 26 are also curved but in a direction opposite to the direction in which the blades 22 are curved. The blades are so arranged that they will coöperate with each other and assist in propelling the rotor by the discharge or action of the exploded charge thereagainst. That is to say the exploded charge when it is delivered from the cylinder will strike the blades 22 at the periphery of the rotor and will advance the rotor. From the blades 22 the charge will be deflected against the adjacent series of blades 26, which latter are stationary. From the blades 26 the charge will again change its course and will then strike another series of the blades 22 that are curved in the opposite direction. From these blades 22 the charge will be deflected against another series of blades 26 that are stationary and from these blades 26 it will be again deflected so as to strike another series of the blades 22 and in this manner the charge will find its way through a tortuous passage from the cylinder, through the chamber 24 and out into the air, at the same time the charge will travel in a spiral course from the periphery of the rotor in a direction toward the center thereof. During the course of travel of the charge the rotor will be impelled thereby and the full expansive force of the charge will be utilized against the rotor and by the time the charge passes the innermost series of blades in the rotor, it will be discharged into the atmosphere noiselessly. The valves 27 operate in such a manner that the discharge from the cylinder will be continuous, that is to say, just as one valve is closing the exhaust opening of its cylinder, the valve in the next cylinder is opening, thereby overcoming an unlimited discharge from the chamber 24.

Figure 1:
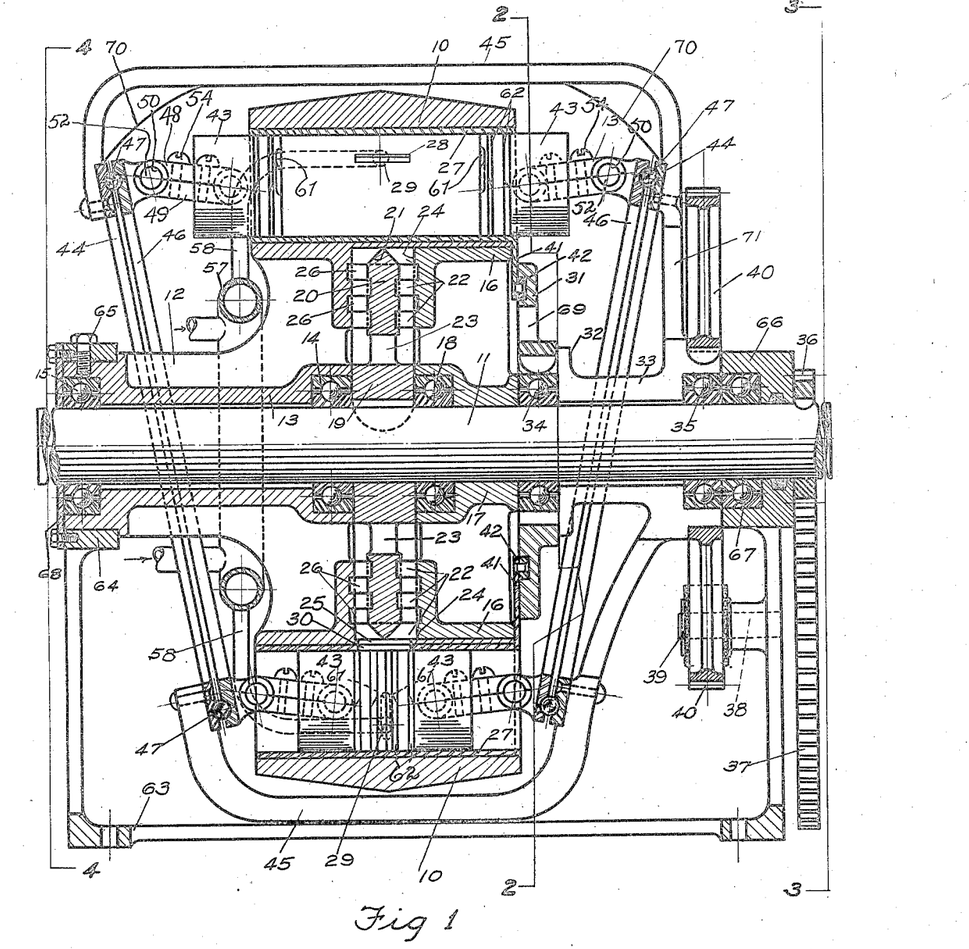
Figure 1 is a vertical longitudinal sectional view taken on line 1—1, Fig. 2.
Figure 2:
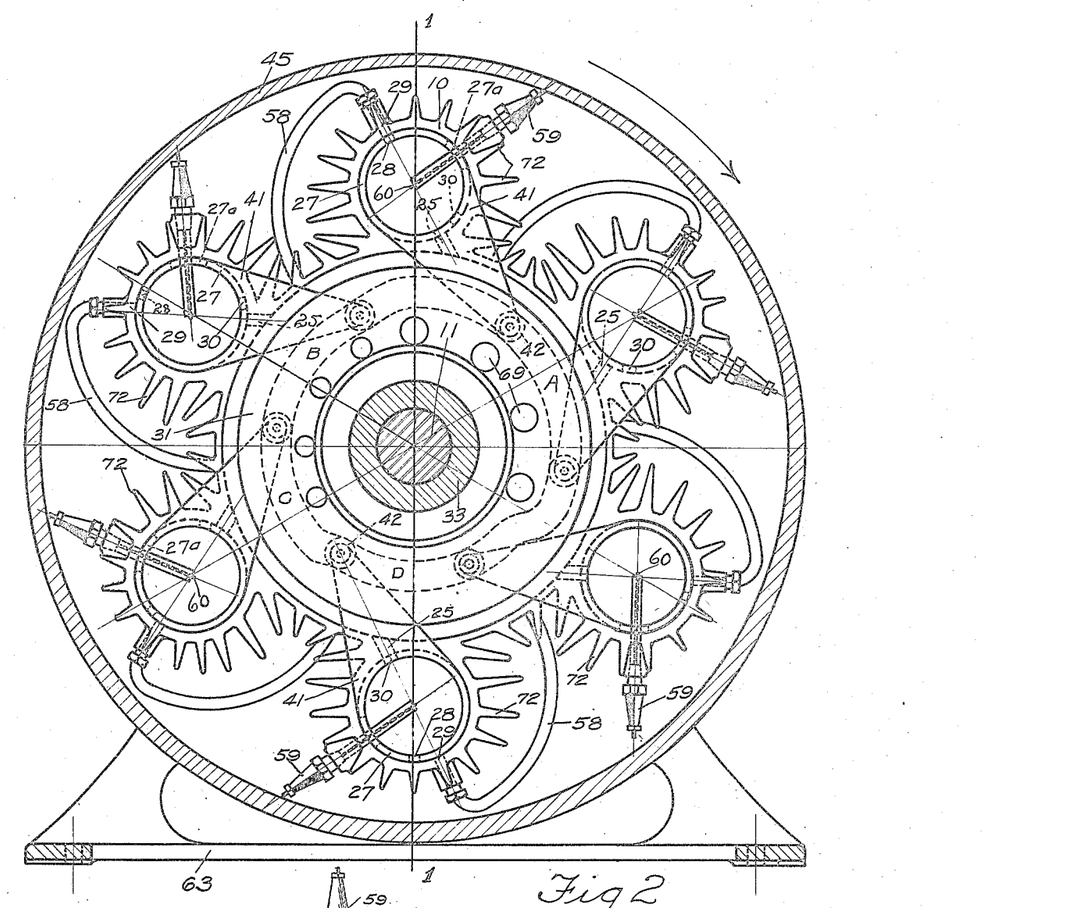
Fig. 2 is a view as taken on line 2—2, Fig. 1 with parts omitted.
Figure 3:
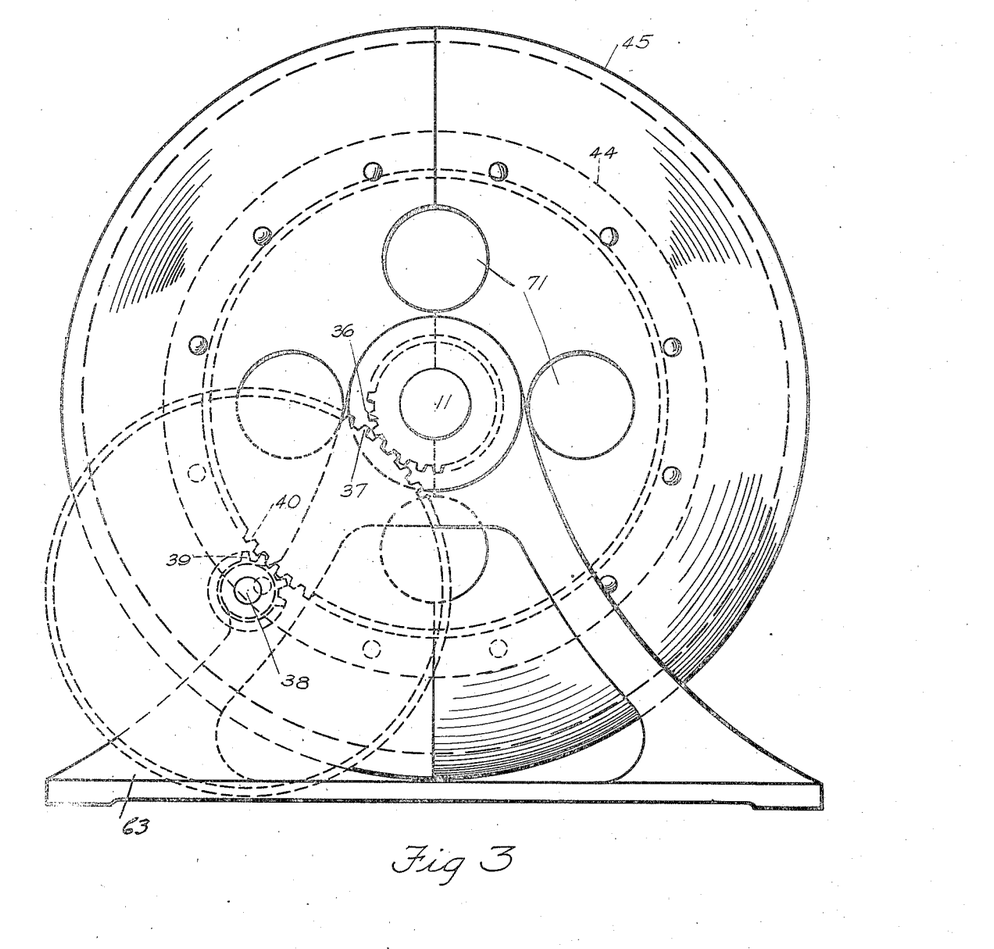
Fig. 3 is a view as taken on line 3—3, Fig. 1.
Figure 4:
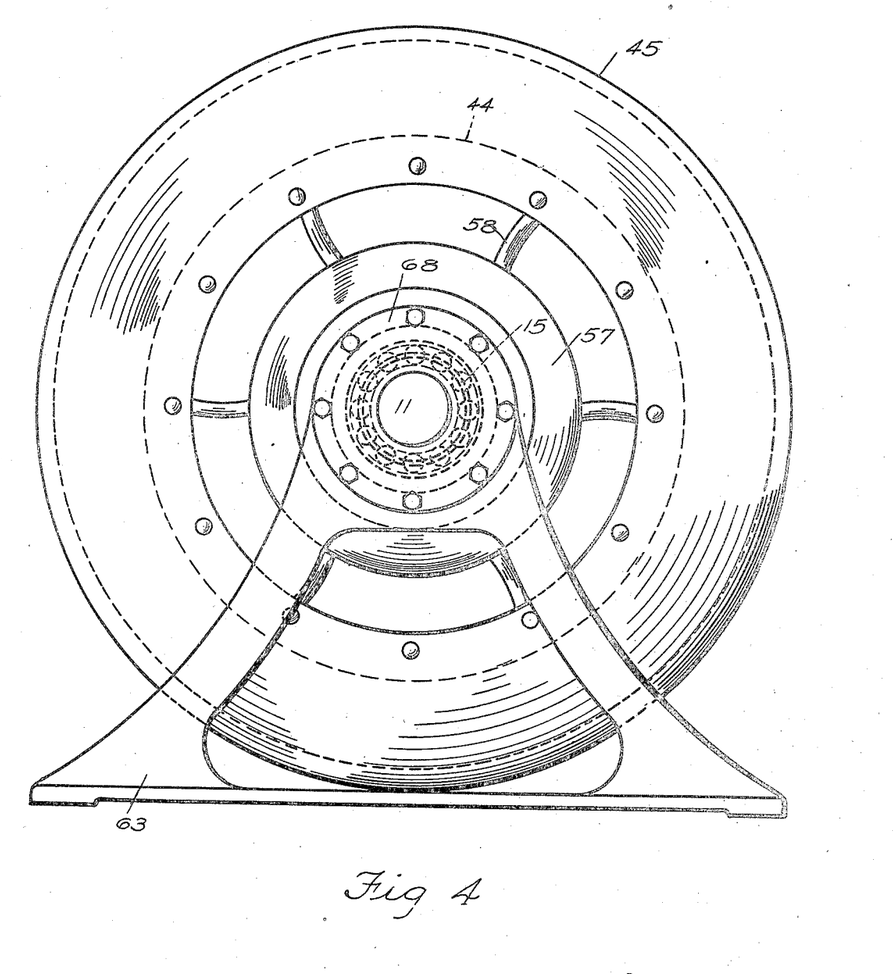
Fig. 4 is a view as taken on line 4—4, Fig. 1.

Arranged within each of the cylinders 10 is a valve 27 preferably of the sleeve type, which fits within each of the cylinders. This valve is provided with an inlet opening 28 that is adapted to move into and out of register with an inlet 29 in the cylinder and the valve is also provided with an outlet port 30 adapted to be moved into and out of register with the discharge outlet port 25 of the cylinder. Motion is imparted to the valve 27 to rotate the same in any suitable manner but preferably by means of a cam 31 which is mounted for rotation in any suitable manner preferably by being connected with a portion 32 of a frame, and in which frame a bearing 33 is arranged through which the shaft 11 passes. Intermediate the shaft 11 and the frame 33 are roller bearings 34—35. The shaft 11 has connected with it for rotation therewith, a gear 36 which in turn meshes with a gear 37, and this gear imparts its movement by means of a shaft 38 to a gear 39 which in turn meshes with a gear 40, which latter is connected with the frame 33 for rotation therewith. Thus it will be seen that when the shaft 11 is rotated, the cam 31 will also be rotated through the medium of the connecting gearing. Each of the valves 27 is provided with an arm 41 having an anti-friction roller 42 mounted rotatably thereon, and which roller operates in the groove of the cam 31. As the cam 31 rotates and during the time that the portion A (see Fig. 2) of the groove is operating upon the roller on the arm 41 of the valve, the valve will be positioned so that the inlet port 28 thereof will register with the inlet opening 29 of the cylinder to admit the charge and the valve will remain open until the portion B of the cam groove operates upon the valve. During that interval of time the charge will be compressed in the cylinder until the portion C of the cam operates upon the valve and while the portion C is thus operating upon the valve the explosion is taking place, and when the portion D of the cam groove is operating upon the valve, then the valve will be moved into a position that the opening 30 will register with the outlet 25 to permit the exploding charge to be delivered from the cylinder and against the blades of the rotor.

Reciprocating within each of the cylinders 10 are opposed pistons 43 forming movable abutments between which the charge is delivered and exploded. These pistons are adapted to be reciprocated in any suitable manner but preferably by means of cams or inclined surfaces 44 which are secured to the frame 45 for rotation therewith and in such positions that their active faces will be always maintained in an inclined position with respect to the axis of rotation of the shaft 11. A coöperating member 46 is provided for each of the members 44 and in order to permit the parts to move relatively and without friction, anti-friction balls or rollers 47 may be provided therebetween to operate in suitable races. These elements 46 are also maintained in an inclined position with respect to the axis of rotation of the shaft and the pistons 43 are connected with the respective elements 46 in any suitable manner which will permit the pistons to be reciprocated in the stationary cylinders by the elements 46 and at the same time permit the element 46 to change its angle of inclination while the elements 44 are being rotated with respect thereto. This may be accomplished in any suitable manner but preferably by means of a link embodying two members 48—49, each of the members being provided with transverse grooves 50 adjacent the extremities thereof, and which grooves are provided with enlarged portions 51 adjacent their longitudinal centers. A fastening pin or bolt 52 is adapted to be seated within the groove 50 and each of the bolts is provided with an enlarged cylindrical portion 53 intermediate its ends which is seated within the enlarged portions 51 of the grooves so that when the two members 48—49 are placed together, the fastening bolts 52 will be held against displacement and the two members may be secured in any suitable manner such as by means of fastening screws 54. In order to permit the parts to be readily assembled, the bolts 52 are provided with heads 55 which are of a diameter slightly larger than the diameter of the central portion 53. With this construction it will be seen that the bolt may be readily inserted in position between the ears 56 by passing one end of the bolt through an enlarged opening of a size to receive the head 55 and which opening will permit the central portion 53 of the bolt to pass therethrough, the ends of the bolt being then supported by the ears 56.

With the pistons 43 thus connected with the elements 46 it will be manifest that as the shaft 11 is rotated and motion is imparted to the frame 33 in a manner already set forth, the elements or cam faces 44 will be rotated with the frame inasmuch as the portion 45 forms a part of the frame 33. The elements 46 being held against rotation as are also the cylinders 10, the rotation of the elements 44 would impart a rocking movement to the elements 46 and this rocking movement, it will be manifest, will cause the pistons 43 to be reciprocated through the medium of the link connection therewith.

The pistons 43 reciprocate toward each other and toward the center of the cylinder and are arranged to stop in close proximity to but spaced from each other. The charge is admitted into the cylinder between the pistons in any suitable manner, such, for instance, as by means of a manifold 57 which receives its supply from any suitable source and from the manifold the charge may be conducted by means of a suitable pipe 58 which communicates with the inlet opening 29 of the cylinder.

A suitable ignition device such as a spark plug 59 is provided for each of the cylinders and the spark plug is so arranged that the points 60 thereof are arranged adjacent the diametric center of the cylinder so that when the charge is exploded, it will be exploded at the center of the cylinder so as to obtain the full benefit of a complete explosion of the charge. Obviously the spark plug will pass through the valve 27, and the opening 27ª in the valve through which the spark plug passes is of sufficient size so that the plug will not interfere with the oscillation of the valve.

In order to permit of this arrangement of the spark plug and also allow the pistons 43 to reciprocate and assume positions in close proximity to each other without injuring the spark plug, the adjacent faces of the pistons are recessed as at 61 to receive the spark plug. Thus it will be seen that the pistons may be brought into close proximity and the pistons will not injure the spark plug and the spark plug will not interfere with the action of the pistons, the latter forming movable abutments between which the charge is exploded.

Obviously the pistons are provided with suitable packing rings 62.

The whole structure may be supported in any suitable manner preferably by means of a supporting frame 63 having a bearing 64 for receiving a portion of the supporting structure 12 and in which bearing the structure may be anchored so as to be held against rotation by means of a suitable anchoring bolt 65. The support 63 may also be provided with a bearing 66 in which is arranged suitable ball bearings 67 through which the shaft 11 passes and a cap plate 68 may also be provided for holding the bearings 15 against displacement.

It is thought that the operation of this device will be clearly understood from the foregoing description, but briefly stated it is as follows:

The charge is admitted into the cylinder between the movable pistons and is exploded, after which it is delivered from the cylinder through the port 25 against the blades of the rotor. The blades 22 of the rotor coöperating with the blades 26 of the chamber 24, will be acted upon by the expanding charge as it is passing from the cylinder and a very rapid rotation will be imparted to the rotor, while at the same time the full expansive action of the exploding charge will be utilized. As the rotor is rotated, its motion will be imparted to the shaft 11 and through the medium of the connecting gearing 36—37—38—39—40, the frame 33—45 as well as the cam 31 and the elements 44 will be rotated. As the cam rotates the valve 27 will be operated in the manner already described and as the elements 44 rotate the pistons 43 will be reciprocated.

During the time that the charge is being admitted into the cylinder the portion A (see Fig. 2) of the cam 31 will be operating upon the valve 27. After the charge has been admitted the pistons 43 will commence to move toward each other and the portion B of the cam will be operating upon the valve. During this time of operation of the cam upon the valve the charge will be compressing and when the portion C of the cam operates upon the valve, the charge will be exploding. At this time the charge will be discharged from the cylinder against the rotor to operate the latter. During this stage of operation the valve 27 will open to discharge the force of the explosion against the vanes or blades of the rotor just after the explosion and before the pistons reach the limits of their inward movements so that the valves will be open and the charge will commence to be discharged from the cylinders before the pistons reach the limit of their inward movement. While the charge is being thus exploded and discharged, the pistons will continue to move toward each other and will then operate to force the exploded charge (or the gas in a live condition) against the blades of the rotor so that the full force of the expanding gases acts upon the blades of the rotor.

It will thus be seen that the force of the explosion will not be employed as a means for separating the pistons or driving the pistons in the opposite directions but the full force of the explosion will be directed against the rotor. The pistons are withdrawn or given a movement in the opposite direction away from each other by means of the element 46 which is operated by the rotary element 44.

With this construction it will also be manifest that the cylinders will be closed after each explosion to insure a clean fresh charge.

The cam 31 is preferably provided with openings 69 which permit of a circulation of air therethrough and the air will also circulate through the openings 23 in the rotor 19.

The frame 33 is so constructed that it will form wings 70 disposed at an angle to direct currents of air through the openings 71 therein, the openings 69 in the cam and the openings 23 in the rotor, so that the parts will be cooled thereby.

Obviously the cylinders 10 may be provided with the usual wings or fins 72 for cooling purposes.

The frame 33—45 may be formed in sections to permit of easy assembling and when so constructed the parts of the frame are held together by means of the gear 40 and cam 31 which when mounted upon the frame will lock the parts together.

While the preferred form of the invention has been herein shown and described, it is to be understood that various changes may be made in the details of construction and in the combination and arrangement of the several parts within the scope of the claims without departing from the spirit of this invention.

Obviously if found necessary, a fly wheel may be employed.

What is claimed as new is:—

1. An engine of the character described embodying a rotor, a series of cylinders adjacent the path of rotation of the rotor, means for compressing and means for igniting a charge in the respective cylinders at the diametric centers of the cylinders whereby the explosion will be produced from the diametric center of the cylinder outwardly toward the wall of the cylinder, and means for directing the exploding charge from the cylinders to the rotor to rotate the latter.

2. An engine of the character described embodying a rotor, a series of cylinders adjacent the path of rotation of the rotor, means for compressing and means for igniting a charge in the respective cylinders at the diametric centers of the cylinders whereby the explosion will be produced from the diametric center of the cylinder outwardly toward the wall of the cylinder, and means for directing the exploding charge from the cylinders to the rotor to rotate the latter, the first recited means being responsive in its movement to the operation of the said rotor.

3. An engine of the character described embodying a rotor, a series of cylinders adjacent the path of rotation of the rotor, means for compressing and means for igniting a charge in the respective cylinders at the diametric centers of the cylinders whereby the explosion will be produced from the diametric center of the cylinder outwardly toward the wall of the cylinder, and means for directing the exploding charge from the cylinders to the rotor to rotate the latter, the last recited means embodying a sleeve valve for controlling the discharge of the exploding charge from the cylinder.

4. An engine of the character described embodying a rotor, a series of cylinders adjacent the path of rotation of the rotor, means for compressing and means for igniting a charge in the respective cylinders at the diametric centers of the cylinders whereby the explosion will be produced from the diametric center of the cylinder outwardly toward the wall of the cylinder, means for directing the exploding charge from the cylinders to the rotor to rotate the latter, the said cylinders being stationary and arranged concentrically about the rotor, the last recited means embodying a valve, and cam mechanism for actuating the valve.

5. An internal combustion engine embodying a cylinder, a piston and an abutment movable relatively one with relation to the other for compressing a charge in the cylinder, means for supplying a charge therebetween, means for exploding the charge from the diametric center of the cylinder outwardly toward the wall of the cylinder, and means for exhausting the cylinder.

6. An internal combustion engine embodying a cylinder, a piston and an abutment movable relatively one with relation to the other for compressing a charge in the cylinder, means for supplying a charge therebetween, an ignition device extending into the cylinder between the compression means and terminating adjacent the diametric center of the cylinder for exploding the charge from the diametric center of the cylinder outwardly toward the wall of the cylinder, and means for exhausting the cylinder.

7. An internal combustion engine embodying a cylinder, opposed pistons reciprocable therein, means for reciprocating the pistons, an ignition device extending into the cylinder through the wall thereof and terminating adjacent the diametric center of the cylinder and between the pistons for exploding a charge from the diametric center of the cylinder outwardly toward the wall of the cylinder, and means whereby the pistons may be brought into close proximity to each other.

8. An internal combustion engine embodying a cylinder, opposed pistons reciprocable therein, means for reciprocating the pistons, and an ignition device extending into the cylinder through the wall thereof and between the pistons for exploding a charge, there being a recess in one face of one or both of the pistons for receiving the ignition device when the piston is moved into close proximity thereto.

9. An internal combustion engine embodying a cylinder, opposed pistons reciprocable therein, means for reciprocating the pistons, an ignition device extending into the cylinder through the wall thereof and between the pistons for exploding a charge, there being a recess in one face of one or both of the pistons for receiving the ignition device when the piston is moved into close proximity thereto, there being an inlet and an outlet opening in the cylinder, a sleeve valve for controlling said openings and in which valve the pistons operate, and means for oscillating the valve.

10. An engine of the character described embodying a cylinder having an inlet opening and an outlet opening, pistons reciprocable in the cylinder and in opposition to each other, means for reciprocating the pistons, a rotor operable adjacent the said outlet opening, means for controlling the said outlet opening, means for exploding a charge between the said pistons, and means for actuating the said controlling means whereby the exploded charge will be delivered from the cylinder against the rotor to actuate the latter.

11. An engine of the character described embodying a cylinder having an inlet opening and an outlet opening, pistons reciprocable in the cylinder and in opposition to each other, means for reciprocating the pistons, a rotor operable adjacent the said outlet opening, means for controlling the said outlet opening, means for exploding a charge between the said pistons, and means for actuating the said controlling means whereby the exploded charge will be delivered from the cylinder against the rotor to actuate the latter, while the pistons are moving toward each other and in advance of the limit of their movements toward each other.

12. An engine of the character described embodying a cylinder having an inlet opening and an outlet opening, pistons reciprocable in the cylinder and in opposition to each other, means for reciprocating the pistons, a rotor operable adjacent the said outlet opening, means for controlling the said outlet opening, means for exploding a charge between the said pistons, and means for actuating the said controlling means whereby the exploded charge will be delivered from the cylinder against the rotor to actuate the latter, while the pistons are moving toward each other and in advance of the limit of such movements, the third recited means embodying an ignition device arranged to explode the charge at substantially the diametric center of the cylinder.

13. An engine of the character described embodying a rotor, a series of cylinders arranged concentric with the rotor, a chamber communicating with the cylinders and in which chamber the rotor operates, opposed pistons operating in each of the cylinders, means common to the respective pistons for reciprocating them, means for successively exploding a charge in the cylinders, and means for controlling the communicating openings between the chamber and the respective cylinders whereby the exploding charge will be delivered from the cylinders and against the rotor for operating it.

14. An engine of the character described embodying a rotor, a series of cylinders arranged concentric with the rotor, a chamber communicating with the cylinders and in which chamber the rotor operates, opposed pistons operating in each of the cylinders, means common to the respective pistons for reciprocating them, means for successively exploding a charge in the cylinders, and means for controlling the communicating openings between the chamber and the respective cylinders whereby the exploding charge will be delivered from the cylinders and against the rotor for operating it, the first recited means embodying a rotary element responsive in its operation to the rotation of the said rotor.

15. An engine of the character described embodying a rotor, a series of cylinders arranged concentric with the rotor, a chamber communicating with the cylinders and in which chamber the rotor operates, opposed pistons operating in each of the cylinders, means common to the respective pistons for reciprocating them, means for successively exploding a charge in the cylinders, and means for controlling the communicating openings between the chamber and the respective cylinders whereby the exploding charge will be delivered from the cylinders and against the rotor for operating it, the first recited means embodying a rotary element, the active face of which operates in a plane inclined to the plane of rotation of the rotor and responsive in its operation to the rotation of the rotor.

16. An engine of the character described embodying a rotor, a series of cylinders arranged concentric with the rotor, a chamber communicating with the cylinders and in which chamber the rotor operates, opposed pistons operating in each of the cylinders, means common to the respective pistons for reciprocating them, means for successively exploding a charge in the cylinders, and means for controlling the communicating openings between the chamber and the respective cylinders whereby the exploding charge will be delivered from the cylinders and against the rotor for operating it, the first recited means embodying a rotating element the active surface of which operates in a plane inclined to the plane of rotation of the rotor and link connections between the said element and the respective pistons.

17. An engine of the character described embodying a rotor, a series of stationary cylinders arranged concentric therewith, a chamber arranged concentric with the axis of rotation of the rotor and in which chamber the rotor operates, said chamber having communication with each of the cylinders whereby the exploded gases will be delivered from the chamber against the rotor, opposed pistons operating in each of the cylinders, means for controlling the openings betwen the chamber and the cylinders, means for reciprocating the pistons and embodying a rotating element, the active surface of which operates in a plane inclined to the plane of operation of the rotor, the first recited means embodying sleeve valves individual to the cylinders, and means common to the sleeve valves and responsive in its operation to the operation of the rotor for actuating the valves.

18. An engine of the character described embodying a valve, a series of stationary cylinders arranged concentric therewith, a chamber arranged concentric with the axis of rotation of the rotor and in which chamber the rotor operates, said chamber having communication with each of the cylinders whereby the exploded gases will be delivered from the chamber against the rotor, opposed pistons operating in each of the cylinders, means for controlling the openings between the chamber and the cylinders, means for reciprocating the pistons and embodying a rotating element the active surface of which operates in a plane inclined to the plane of operation of the rotor, the first recited means embodying sleeve valves individual to the cylinders, and a cam device operatively connected with the rotor for oscillating the said sleeve valves.

19. An engine of the character described embodying a rotor, a series of stationary cylinders arranged concentric therewith, a chamber arranged concentric with the axis of rotation of the rotor and in which chamber the rotor operates, said chamber having communication with each of the cylinders whereby the exploded gases will be delivered from the chamber against the rotor, opposed pistons operating in each of the cylinders, means for controlling the openings between the chamber and the cylinders, means for reciprocating the pistons and embodying a rotating element the active surface of which operates in a plane inclined to the plane of operation of the rotor, the first recited means embodying sleeve valves individual to the cylinders, a cam device operatively connected with the rotor for oscillating the said sleeve valves, wings or blades projecting laterally from the walls of the said chamber and coöperating wings or blades projecting laterally from the faces of the rotor, the respective series of blades being arranged concentrically, one concentric series operating intermediate the other concentric series.

20. An engine of the character described embodying a rotor, a series of stationary cylinders arranged concentric therewith, a chamber arranged concentric with the axis of rotation of the rotor and in which chamber the rotor operates, said chamber having communication with each of the cylinders whereby the exploded gases will be delivered from the cylinders against the rotor, opposed pistons operating in each of the cylinders, means for reciprocating the pistons and embodying a rotating element the active surface of which operates in a plane inclined to the plane of operation of the rotor, the first recited means embodying sleeve valves individual to the cylinders, means for oscillating the sleeve valves, wings or blades projecting laterally from the faces of the rotor and the respective adjacent walls of the said chamber, all of said blades being curved and arranged in concentric series.

21. An engine of the character described embodying a valve, a series of stationary cylinders arranged concentric therewith, a chamber arranged concentric with the axis of rotation of the rotor and in which chamber the rotor operates, said chamber having communication with each of the cylinders whereby the exploded gases will be delivered from the cylinders against the rotor, opposed pistons operating in each of the cylinders, means for controlling the openings between the chambers and the cylinders, means for reciprocating the pistons and embodying a rotating element the active surface of which operates in a plane inclined to the plane of operation of the rotor, the first recited means embodying sleeve valves individual to the cylinders, means for oscillating the sleeve valves, wings or blades projecting laterally from the faces of the rotor and the respective adjacent walls of the said chamber, all of said blades being curved and arranged in concentric series, the blades of alternate series curving in opposite directions.

22. An engine of the character described embodying a rotor, a series of stationary cylinders encompassing the rotor, opposed pistons reciprocable in each of the cylinders, means whereby an exploded charge may be delivered from each of the cylinders from between the respective pistons and against the rotor to actuate it, means for controlling the delivery of such charge, a rotatable frame work operatively connected with the rotor, means connected with the frame work and operating in a plane inclined to the plane of operation of the pistons for reciprocating the pistons, and means whereby the rotation of such frame work will create currents of air and circulate them against the cylinders to cool them.

23. An engine of the character described embodying a rotor, a series of stationary cylinders encompassing the rotor, opposed pistons reciprocable in each of the cylinders, means whereby an exploded charge may be delivered from each of the cylinders from between the respective pistons and against the rotor to actuate it, means for controlling the delivery of such charge, a rotatable frame work operatively connected with the rotor, means connected with the frame work and operating in a plane inclined to the plane of operation of the pistons for reciprocating the pistons, means whereby the rotation of such frame work will create currents of air and circulate them against the cylinders to cool them, the first recited means embodying a sleeve valve individual to the cylinders, and a cam device rotatable with the said frame and operating to impart intermittent movements to the said valves.

24. An engine of the character described embodying a rotor, a series of stationary cylinders encompassing the rotor, opposed reciprocating pistons in each of the cylinders and between which pistons the charge is exploded, means for directing the force of the explosion from the cylinders and against the rotor for actuating it, and means for reciprocating the pistons, the last recited means embodying a revoluble element having an oblique active surface, an oscillatory element operatively connected with the respective pistons, and roller bearings interposed between the said oscillatory element and the said oblique surface whereby the former will be oscillated by the rotation of the latter.

25. An engine of the character described embodying a rotor, a series of stationary cylinders encompassing the rotor, opposed reciprocating pistons in each of the cylinders and between which pistons the charge is exploded, means for directing the force of the explosion from the cylinders and against the rotor for actuating it, and means for reciprocating the pistons, the last recited means embodying a revoluble element having an oblique active surface, an element adjacent the said oblique surface and adapted to be oscillated by the said surface when the latter is rotated, and link connections between the said element and the respective pistons.

26. A motor embodying a cylinder, a piston reciprocable therein, an oscillating element for actuating the piston, and a link connection between the said element and piston, the said link embodying separable elements having registering transverse grooves, sand grooves having an enlarged portion intermediate their ends, a pin extending through and beyond the ends of the grooves, said pin having an enlarged portion adapted to enter the enlarged portions of the grooves, and a head on one end of the pin, the diameter of the head being slightly larger than the diameter of said enlarged portion thereof, there being registering openings in which the ends of the pin are adapted to be seated, one of the openings being of a diameter to receive the head of the pin.

27. A motor embodying a cylinder, a piston reciprocable therein, an oscillating element for actuating the piston, and a link connection between the said element and piston, the said link embodying separable elements having registering transverse grooves, said grooves having an enlarged portion intermediate their ends, a pin extending through and beyond the ends of the grooves, said pin having an enlarged portion adapted to enter the enlarged portions of the grooves, a head on one end of the pin, the diameter of the head being slightly larger than the diameter of the said enlarged portion thereof, there being registering openings in which the ends of the pin are adapted to be seated, one of the openings being of a diameter to receive the head of the pin, and means for detachably securing the sections of the link together.

28. An engine of the character described embodying a rotor, a cylinder having a discharge outlet adjacent the path of rotation of the rotor, opposed pistons reciprocable in the cylinder, means for exploding a charge between the pistons, means for controlling the said discharge opening, the said means operating to open the discharge outlet to deliver the exploding charge from the cylinder to the rotor in advance of the limit of the movements of the said piston toward each other, and means for reciprocating the pistons in the cylinder.

29. An engine of the character described embodying a rotor, a cylinder having a discharge outlet adjacent the path of rotation of the rotor, opposed pistons reciprocable in the cylinder; means for exploding a charge between the pistons, means for controlling the said discharge opening, the said means operating to open the discharge outlet to deliver the exploding charge from the cylinder to the rotor in advance of the limit of the movements of the said pistons toward each other, and means responsive to the operation of the rotor for reciprocating the pistons.

30. An engine of the character described embodying a rotor, a cylinder having a discharge outlet adjacent the path of rotation of the rotor, opposed pistons reciprocable in the cylinder, means for exploding a charge between the pistons, means for controlling the said discharge opening, the said means operating to open the discharge outlet to deliver the exploding charge from the cylinder to the rotor in advance of the limit of the movements of the said pistons toward each other, means for reciprocating the pistons, and means for supplying a charge to the cylinder and between the pistons.

In testimony whereof we have signed our names to this specification, on this 24th day of September, A. D. 1919.

E. C. DES ENFANTS.
FLOYD A. HUMMEL.